C. J. COLEMAN.
ENGINE STARTER.
APPLICATION FILED MAR. 29, 1907. RENEWED JULY 27, 1912.

1,056,972.

Patented Mar. 25, 1913.
5 SHEETS—SHEET 1.

Witnesses:

Inventor:
Clyde J Coleman
by Henry D Williams
Atty.

C. J. COLEMAN.
ENGINE STARTER.
APPLICATION FILED MAR. 29, 1907. RENEWED JULY 27, 1912.

1,056,972.

Patented Mar. 25, 1913.

5 SHEETS—SHEET 3.

Witnesses:
Bernard Cowen
Wm. Ashley Kelly

Inventor:
Clyde J. Coleman
by Henry D. Williams
Atty.

C. J. COLEMAN.
ENGINE STARTER.
APPLICATION FILED MAR. 29, 1907. RENEWED JULY 27, 1912.

1,056,972.

Patented Mar. 25, 1913

5 SHEETS—SHEET 4.

Witnesses:
Bernard Cowen
Wm. Ashley Kelly

Inventor.
Clyde J Coleman
by Henry D. Williams
Atty.

C. J. COLEMAN.
ENGINE STARTER.
APPLICATION FILED MAR. 29, 1907. RENEWED JULY 27, 1912.

1,056,972.

Patented Mar. 25, 1913.

5 SHEETS—SHEET 5.

Witnesses:

Inventor:
Clyde J. Coleman
by Henry D. Williams
Atty.

UNITED STATES PATENT OFFICE.

CLYDE J. COLEMAN, OF NEW YORK, N. Y., ASSIGNOR TO CONRAD HUBERT, OF NEW YORK, N. Y.

ENGINE-STARTER.

1,056,972.   Specification of Letters Patent.   Patented Mar. 25, 1913.

Application filed March 29, 1907, Serial No. 365,396. Renewed July 27, 1912. Serial No. 711,918.

*To all whom it may concern:*

Be it known that I, CLYDE J. COLEMAN, a citizen of the United States, residing in the borough of Manhattan, city of New York, in the county of New York and State of New York, have invented a certain new and useful Improvement in Engine-Starters, of which the following is a specification, reference being had therein to the accompanying drawings, forming a part thereof.

My invention relates to starting means for engines, such as internal-combustion engines, which are not self-starting, and it is particularly useful in connection with automobiles, in which the engines must be started frequently.

In previous applications, for example, Serial No. 274,819, filed August 19, 1905, which became Letters Patent No. 887,067, May 12, 1908, and Serial No. 303,130, filed February 26, 1906, which became Letters Patent No. 867,795 October 8, 1907, I have disclosed engine-starters of the same general character as that of the present invention, and the object of this invention is to improve the construction and operation of such devices in several particulars which will be hereinafter specified in connection with the description of the illustrated embodiment of the invention. These improvements relate to the centrifugal clutch for effecting the re-storing of the energy-storing device with energy, the ratchet mechanism for connecting the energy-storing device with the engine to start the latter, and the connections between the springs used as energy-storing devices and the other parts of the mechanism.

I will now describe the construction embodying my invention illustrated in the accompanying drawings, and will thereafter point out my invention in claims.

Figure 1:
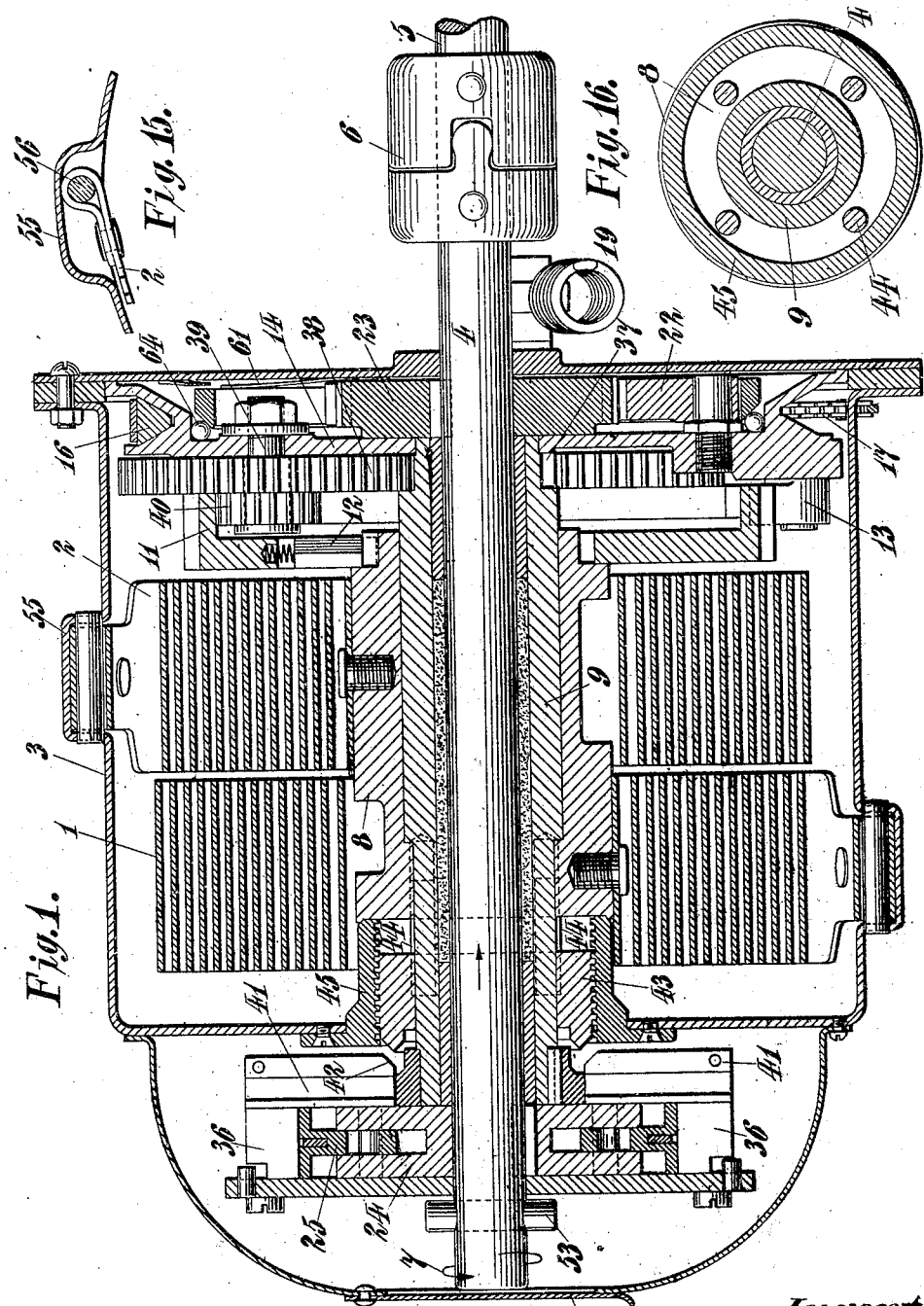
Figure 2:
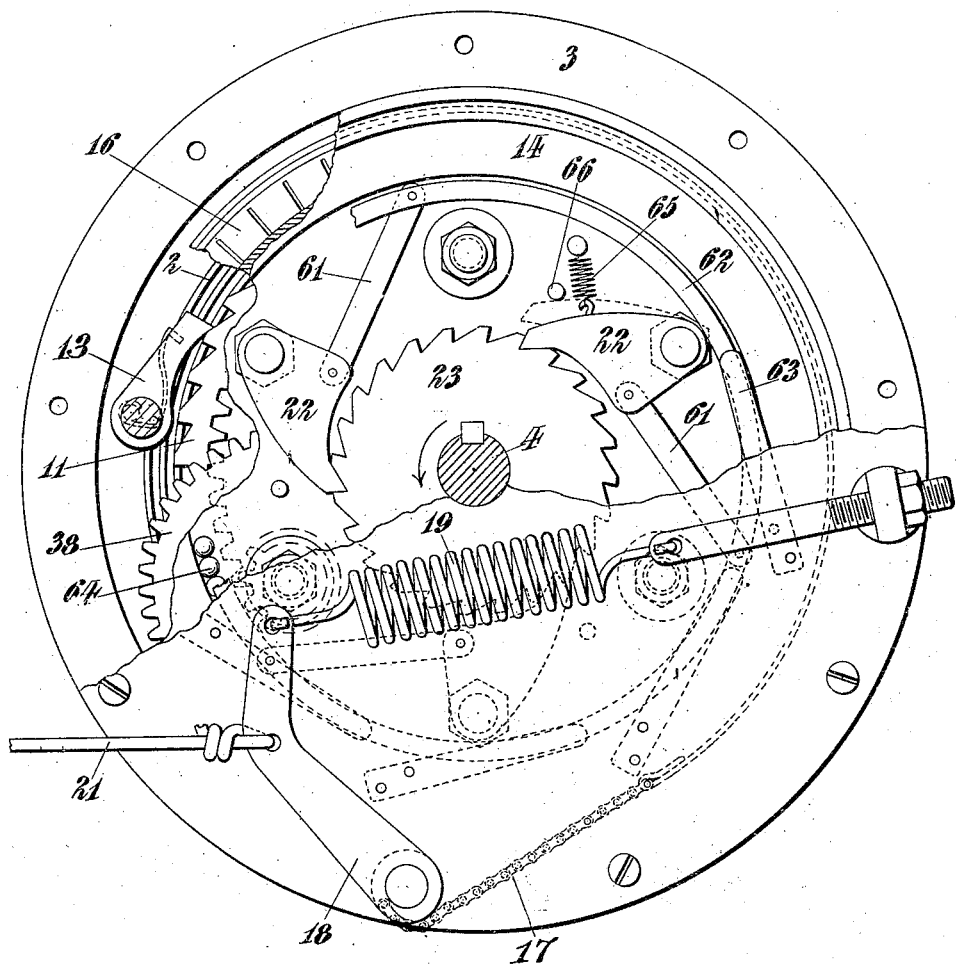
Figure 3:
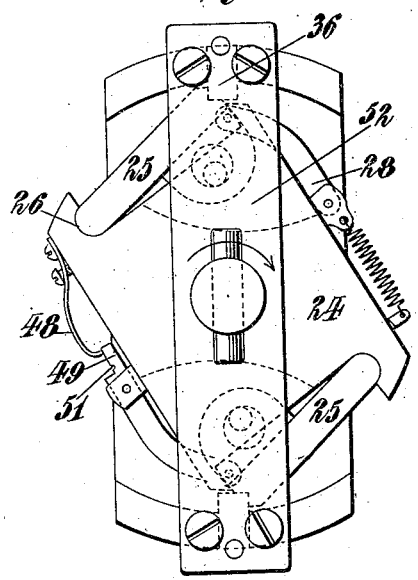
Figure 4:
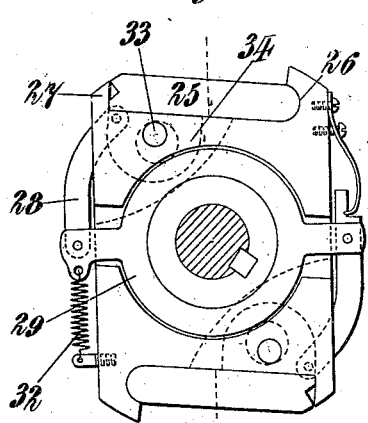
Figure 5:
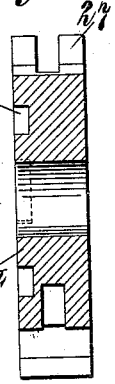
Figure 6:
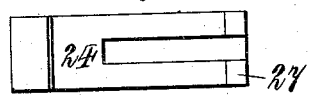
Figure 7:
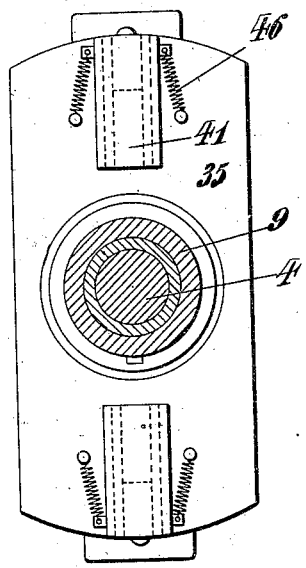
Figure 8:
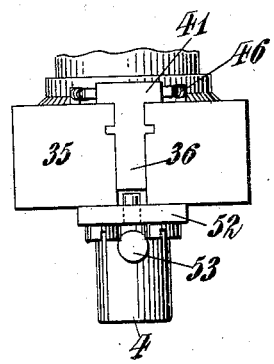
Figure 9:
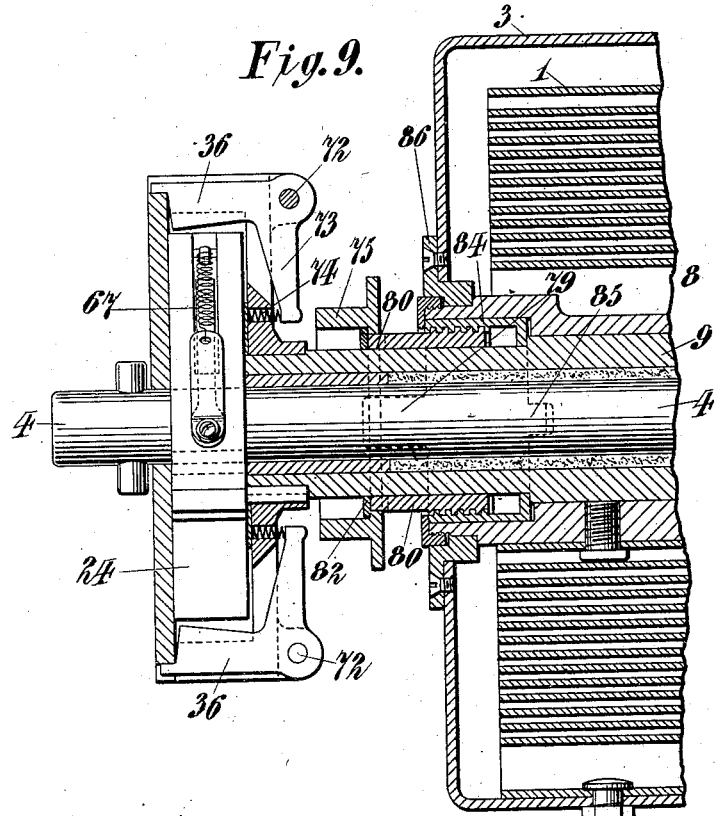
Figure 10:
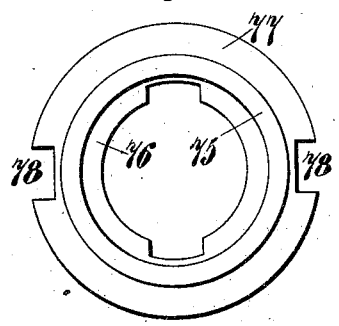
Figures 11, 12:
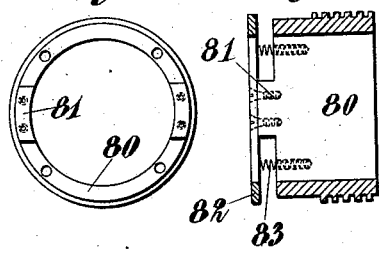
Figure 13:
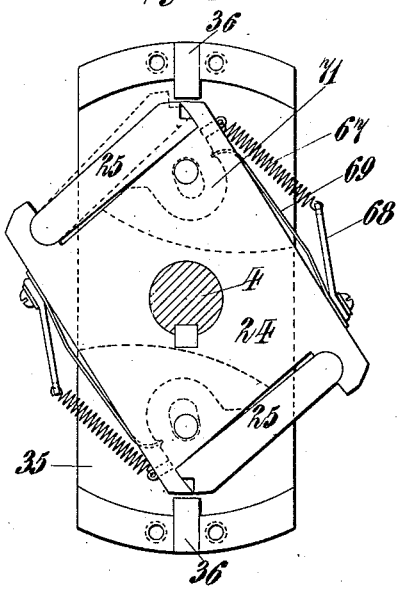
Figure 14:
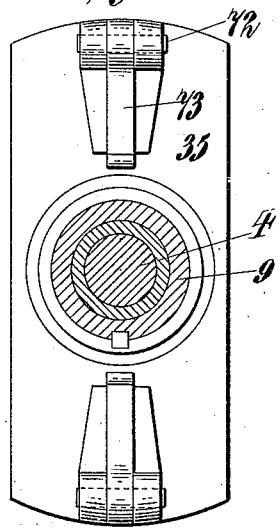

Figure 1 is a longitudinal central vertical section of the engine starter. Fig. 2 is an end elevation, partly in section, of the same. Fig. 3 is an end elevation of the centrifugal rewinding clutch. Fig. 4 is a rear elevation of the centrifugal pawl carrier, with the pawls and their controlling devices in place. Fig. 5 is a vertical sectional view of the pawl carrier, taken from left to right on the plane 5, 5, in Fig. 4. Fig. 6 is a bottom view of the pawl carrier. Fig. 7 is a rear elevation of the dog carrier, with the dogs in position. Fig. 8 is a plan view of the dog carrier and dogs. Fig. 9 is a longitudinal central vertical section of a portion of the engine starter showing a modified form of rewinding mechanism. Fig. 10 is a front elevation of the modified form of releasing member for releasing the dogs. Fig. 11 is a front elevation, and Fig. 12 is a vertical central section of the sleeve for actuating the releasing member. Fig. 13 is a front elevation of the modified form of rewinding clutch. Fig. 14 is a rear elevation of the modified form of dog carrier and dogs. Fig. 15 is a detail sectional view of the connection between one of the springs and the casing. Fig. 16 is a detail vertical transverse section showing the connection between the releasing device and the spring sleeve.

The engine starter comprises an energy-storing device, means for connecting it with an engine to start the engine, and means for connecting it with the engine to restore the energy-storing device with energy.

The energy-storing device, in the illustrated embodiment of the invention, comprises two spiral springs 1 and 2, connected, at one end, to a casing 3 in which the mechanism is inclosed, and at the other end to intermediate mechanism by which power is transmitted to and from the springs and the power shaft 4 of the starter. The shaft 4 is connected with the shaft 5 of the engine to be started by means of a flexible clutch 6.

The direction of rotation of the engine and the shaft 4 is shown by an arrow 7 (Fig. 1).

In starting the engine the springs are connected with the shaft 4 without change of speed ratio. The inner ends of the springs are fixed to a sleeve 8 journaled loosely on a second sleeve 9, which, in turn, is loosely journaled on the shaft 4. A ratchet wheel 11 is journaled on the sleeve 8 and is connected to rotate with it by spring pawls 12, which engage teeth on the sleeve. The object of this form of connection is to prevent the ratchet wheel from unwinding the springs too far, through the momentum of the mechanism, after the springs have unwound to the full extent of their elastic movement in starting the engine.

The ratchet wheel 11 is provided with peripheral teeth engaged by pawls 13 pivoted on a brake wheel 14, which is journaled at its periphery in the casing 3. A peripheral groove in the brake wheel is engaged by a band brake 16. One end of the brake is fixed to the casing and the other end is connected by a chain 17 with a cranked lever 18. A spring 19 connected with a lever holds the brake normally in action, so that the brake wheel is held from rotation, but the lever is connected, by a wire 21, with a suitable treadle (not shown) by which the brake may be released by the operator. When the brake is so released the brake wheel is rotated by the springs, and this rotation is communicated to the shaft 4, and thence to the engine, by pawls 22 pivoted on the brake wheel, and a ratchet wheel 23 engaged by the pawls and keyed to the shaft.

The means for connecting the springs with the engine to rewind them, or re-store them with energy for their next operation, are constructed to come into operation automatically upon the attainment of a predetermined speed by the engine, and to cease their operation when the springs are fully wound up. A pawl carrier 24, constituting one member of a clutch for connecting the shaft 4 with the springs, is keyed to the shaft 4, and carries two dogs 25 (Fig. 3), which are pivoted by their rounded extremities 26 in sockets on the pawl carrier, being retained by shoulders 27 engaging their other ends. The pawls are connected, by links 28, with a ring-shaped lever 29 journaled in a groove 31 in the rear face of the pawl carrier. A spring 32 connected with the lever 29 tends to hold the pawls in their inoperative position, as shown in Fig. 4. When a sufficient speed of rotation is attained by the pawl carrier, however, the pawls swing outwardly, under the influence of centrifugal force, and this movement is limited by pins 33 which traverse holes in ears 34 on the pawls.

The other member of the clutch consists of a dog carrier 35, which carries dogs 36 adapted to be engaged by the centrifugal pawls, as shown in Fig. 3. When the dogs are so engaged the dog carrier is rotated, and with it the sleeve 9 upon which it is keyed. The other end of the sleeve is provided with gear teeth 37, which engage planetary gears 38 journaled on studs 39 on the brake wheel 14. To each gear is fixed a pinion 40, and these pinions mesh with internal gear teeth formed on the ratchet wheel 11. Through this mechanism the springs are rewound by the engine at a much reduced speed ratio which makes little demand on the engine, and the springs are retained in this condition, until the engine is again to be started, by the pawls 13 and the brake wheel 14.

The means for rewinding the springs are constructed to cease their operation automatically when the springs are completely wound up. The dogs 36 are slidingly mounted in radial slots in the dog carrier, and are provided with inwardly-extending arms 41, which are grooved and are guided in suitable ways in the dog carrier. The inner ends of the arms 41 are beveled at 42, and are arranged to be engaged by the oppositely-beveled end of a releasing member 43, which is in the form of a sleeve free to slide longitudinally on the sleeve 9. The releasing member is externally screw-threaded and engages a nut 45 fixed to the casing. It is to be noted that the stationary nut 45, with the sleeve member 43, forms a supporting bearing for the starter shaft 4 and spring-winding sleeve 9 and their adjuncts at the front of the starter. Pins 44 projecting from the member 43 loosely engage sockets in the sleeve 8, as shown in dotted lines, Fig. 1, so that these parts rotate in unison. In consequence of this construction the winding movement of the springs and the sleeve 8 causes the member 43 to move along the sleeve 9 until, after the predetermined number of turns, it engages the arms 41, moves the dogs outwardly until they are disengaged from the centrifugal pawls, and thus interrupts the operation of the rewinding mechanism. The first unwinding movement of the springs causes the member 43 to release the dogs, so that they may again engage the pawls as soon as the latter are thrown into operative position by the attainment of a sufficient speed by the engine. This return movement of the dogs is caused by springs 46 connecting the dogs and the dog carrier. To insure the full engagement of the dogs and pawls a detent spring 48 is mounted on the pawl carrier and engages a friction surface 49 on one of the links 28. A notch 51 engages the end of the spring when the pawls are in inoperative position, and thus a substantial centrifugal force is required to start the outward movement of the pawls, so that when the notch is finally disengaged from the detent the pawls are thrown quickly to their operative position so as to have a full engagement with the dogs.

The dog carrier is provided with a cross bar 52 which may be engaged by a suitable crank when it is necessary to wind up the springs by hand, as in the first use of the device, and the shaft 4 is provided with a cross pin 53 to engage a starting crank in case it becomes necessary, under any circumstances, to start the engine by hand. Access to the shaft for these purposes is had through a door 54 on the end of the casing.

As a convenient way of fastening the springs to the casing, the casing is provided with recessed projections 55, and the ends of the springs are looped and are secured by pins 56 passing through the springs and the projections. By this arrangement the pins 56 are rendered accessible from the outside of the casing.

The two springs are fastened to the sleeve 8 on opposite sides, so that any lateral pressure from the springs may be neutralized and friction in the apparatus avoided.

To prevent the starting pawls 22 from engaging and clicking on the ratchet 23 while the engine is in operation the pawls are connected, by links 61 (Fig. 2), with a friction ring 62 which is engaged by fixed friction springs 63 on the casing. A ball bearing 64 between the friction ring and the brake wheel supports the friction ring and also prevents it from participating in the movements of the brake wheel owing to frictional contact therewith. When the brake wheel rotates during the starting operation the drag of the friction ring causes the pawls 22 to engage the ratchet, but as soon as the engine is started and the movement of the brake wheel ceases the pawls are thrust outward by the ratchet teeth and are held out by the friction device. A spring 65 is attached to one of the pawls to assist this operation, and the outward movement of the pawls is limited by a stop pin 66.

In the modified form of rewinding mechanism shown in Figs. 9 to 14 the centrifugal pawls are not interconnected, but are controlled by independent springs 67 attached to arms 68 on the pawl carrier, and by independent detent springs 69 engaging inwardly-extending ears 71 on the pawls. The dogs are pivoted at 72 to the dog carrier, and they are provided with inwardly-extending arms 73 which normally are pressed rearwardly by springs 74 so as to hold the dogs in position to be engaged by the pawls. The releasing member is a ring 75 slidably mounted on the sleeve 9 by an inwardly-extending flange 76. An outwardly-extending flange 77 is notched at 78 and the notches are engaged by arms 79 projecting from a ring 86 fixed on the casing, and by these means rotation of the ring 75 is prevented. An externally-threaded sleeve 80 is freely mounted on the sleeve 9 and is articulated with the ring 75 by projections 81 and a ring 82 engaging the flange 76. A slight amount of longitudinal lost motion is provided for between these parts, but this is normally taken up by springs 83 engaging the flange 76. This construction is such that the parts 75 and 80 act substantially as one piece.

A nut 84 in a recess in the end of the sleeve 8 is fixed to rotate with the sleeve by lugs 85 on the nut engaging notches in the sleeve. This rotation, which occurs when the spring is winding or unwinding, causes the non-rotative releasing member to move longitudinally so as to engage or disengage the arms 73 on the dogs and thereby to interrupt or to permit the winding operation.

When the rewinding mechanism is not in operation there is no relative movement between the releasing member and the parts actuated thereby, owing to the location of such parts on the normally-fixed member of the clutch, and thus wear on these parts is avoided. The interconnection of the two centrifugal pawls in the first-described construction insures the simultaneous and equal engagement of the pawls with the dogs and avoids the duplication of the controlling devices for the pawls.

It is obvious that various modifications may be made in the construction shown and above particularly described within the principle and scope of my invention.

I claim:

1. An engine starter having, in combination, an energy-storing device, means for connecting said device with an engine to start the engine, means for connecting the engine with said device to re-store the device with energy comprising a pawl carrier rotatively connected with the engine, a rotary dog carrier connected with the energy-storing device, pawls on the pawl carrier constructed to move outwardly under the influence of centrifugal force, dogs on the dog carrier arranged to be engaged by the pawls when the latter move outwardly, and means connected with the energy-storing device and operating automatically to discontinue the energy-storing operation, when completed, by moving the dogs outwardly from engagement with the pawls.

2. An engine starter having, in combination, an energy-storing device, means for connecting said device with an engine to start the engine, means for connecting the engine with said device to re-store the device with energy comprising a pawl carrier rotatively connected with the engine, a rotary dog carrier connected with the energy-storing device, pawls on the pawl carrier constructed to move into operative position under the influence of centrifugal force, dogs on the dog carrier arranged to be engaged by the pawls and provided with inwardly-extending releasing arms, a releasing device moving longitudinally of the axis of rotation of the pawl carrier, and connections between the energy-storing device and the releasing device operating automatically to move the latter into engagement with said releasing arms to release the dogs from engagement with the pawls and interrupt the energy-storing operation when it is completed.

3. An engine starter having, in combination, an energy-storing device, means for connecting said device with an engine to start the engine, and means for connecting the engine with said device to re-store the device with energy comprising a pawl carrier rotatively connected with the engine, a coöperating member rotatively connected with the energy-storing device and constructed to be engaged and driven by said pawls, connections between the pawls to cause them to move in unison into and out of operative position, and a spring connected with the pawls to control their movements.

4. An engine starter having, in combination, a spring, a casing supporting one end of the spring and provided with a recessed projection, means for connecting the spring with an engine to start the engine, and a connection between the casing and the spring comprising a pin passing through said projection and engaging the end of the spring, the pin being accessible from the outside of the casing to permit its convenient removal or insertion.

5. An engine starter having, in combination, an energy-storing device, a pawl carrier rotatively connected therewith, pawls mounted on the pawl carrier, a ratchet in position to be engaged by said pawls and adapted to be connected with the engine to be started, a friction member fixed with relation to the pawl carrier, a rotary friction member in frictional engagement with the fixed friction member, connections between the pawls and the rotary friction member to throw the pawls into operation, and an anti-friction bearing between the pawl carrier and a rotary friction member.

6. An engine starter having, in combination, an energy-storing device, a pawl carrier rotatively connected therewith, pawls mounted on the pawl carrier, a ratchet in position to be engaged by said pawls and adapted to be connected with the engine to be started, frictional means for throwing the pawls into operation, and a spring tending to throw the pawls out of operation.

7. An engine starter having, in combination, an energy-storing device, means for connecting said device with an engine to start the engine, means for connecting the engine with said device to restore the device with energy comprising a pawl carrier rotatively connected with the engine, a rotary dog carrier connected with the energy-storing device, and provided with outwardly-directed slots, pawls on the pawl carrier constructed to move into operative position under the influence of centrifugal force, dogs on the dog carrier mounted in the slots in position normally to be engaged by the pawls and provided with inclined surfaces, and a releasing device connected with the energy-storing device and provided with an inclined surface to engage the inclined surfaces on the dogs and move the dogs outwardly from engagement with the pawls when the energy-storing operation is completed.

8. An engine starter having, in combination, an energy-storing device, means for connecting said device with an engine to start the engine, means for connecting the engine with said device to re-store the device with energy comprising a pawl carrier rotatively connected with the engine, a rotary dog carrier connected with the energy-storing device and provided with outwardly-directed slots, pawls on the pawl carrier constructed to move into operative position under the influence of centrifugal force, dogs on the dog carrier arranged to slide in the slots, springs connected with the dogs and acting to move them inwardly to engage the pawls, and a releasing device connected with the energy-storing device and acting to engage the dogs and move them outwardly from engagement with the pawls when the energy-storing operation is completed.

9. An engine starter having, in combination, an energy-storing device, means for connecting said device with an engine to start the engine, means for connecting the engine with said device to re-store the device with energy comprising a part rotatively connected with the engine, a rotary dog carrier connected with the energy-storing device, dogs on the dog carrier arranged to be engaged by the engine-connected part to restore the device with energy, a rotary longitudinally movable threaded sleeve in control of the dogs, and a stationary nut for actuating such sleeve and, with such sleeve, forming a bearing for the engine-connected part and its adjuncts.

10. An engine starter having, in combination, an energy-storing device, means for connecting said device with an engine to start the engine, means for connecting the engine with said device to re-store the device with energy comprising a part rotatively connected with the engine, a rotary dog carrier connected with the energy-storing device, dogs on the dog carrier arranged normally in position to be engaged by the engine-connected part, a threaded sleeve rotatively connected with the energy-storing device and mounted to move longitudinally, and a stationary nut forming, with the threaded sleeve, a bearing for the energy-storing device and for the engine-connected part and coöperative with the screw-threaded sleeve to move such sleeve longitudinally in one direction to disengage the dogs from the engine-connected part upon the completion of the energy-storing operation and to move such sleeve in the other direction to permit the return of the dogs to normal engaging position upon the use of the energy-storing device in an engine starting operation.

11. An engine starter having, in combination, an energy-storing device, a pawl carrier rotatively connected therewith, a pawl mounted on the pawl carrier, a ratchet in position to be engaged by said pawl and adapted to be connected with the engine to be started, frictional means for throwing the pawl into operation, and a spring tending to throw the pawl out of operation.

In testimony whereof I have affixed my signature in presence of two witnesses.

CLYDE J. COLEMAN.

Witnesses:
 BERNARD COWEN,
 WM. ASHLEY KELLY.

Copies of this patent may be obtained for five cents each, by addressing the "Commissioner of Patents, Washington, D. C."